Oct. 11, 1955  J. W. McCLELLAND  2,720,238
AUTO SAFETY SKID DEVICE

Filed June 25, 1954  4 Sheets-Sheet 1

INVENTOR.
JOHN W. McCLELLAND
BY
Joshua H. Potts
HIS ATTORNEY.

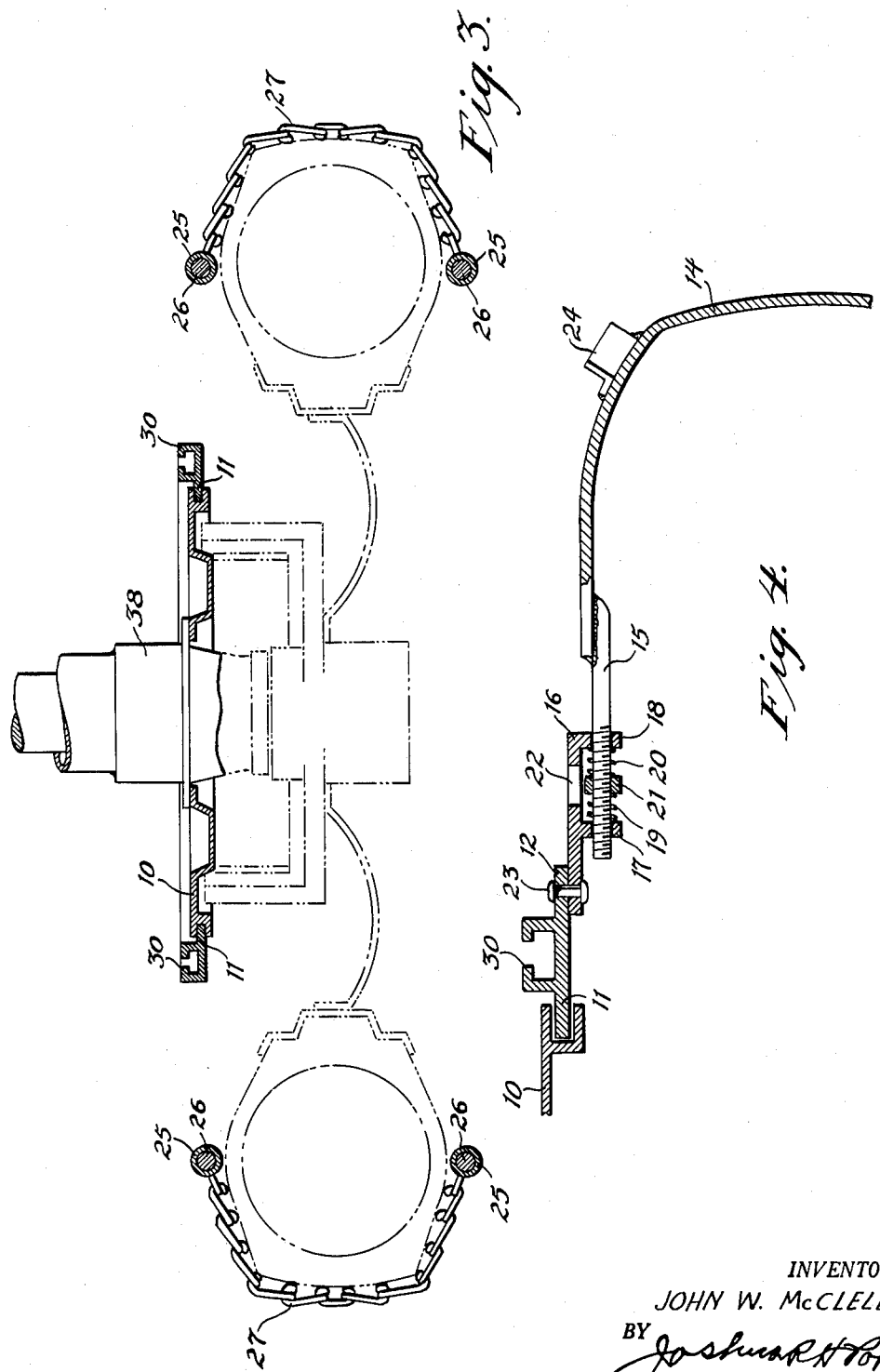

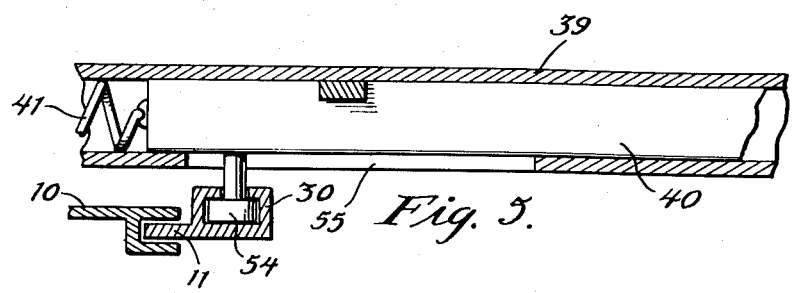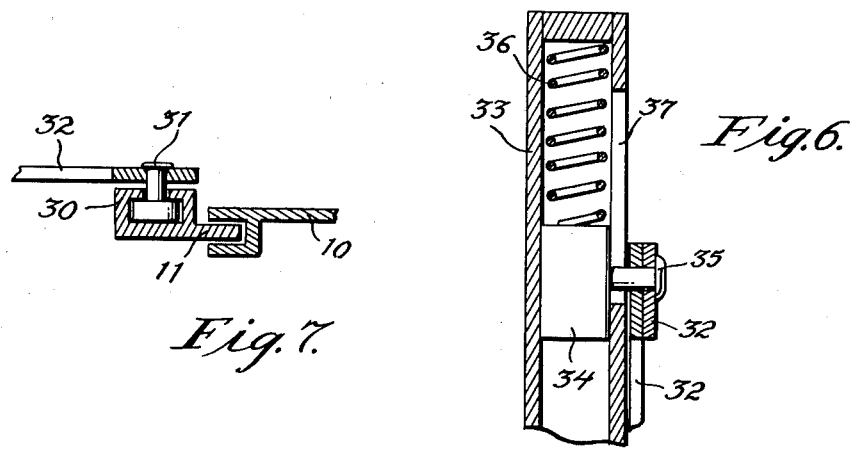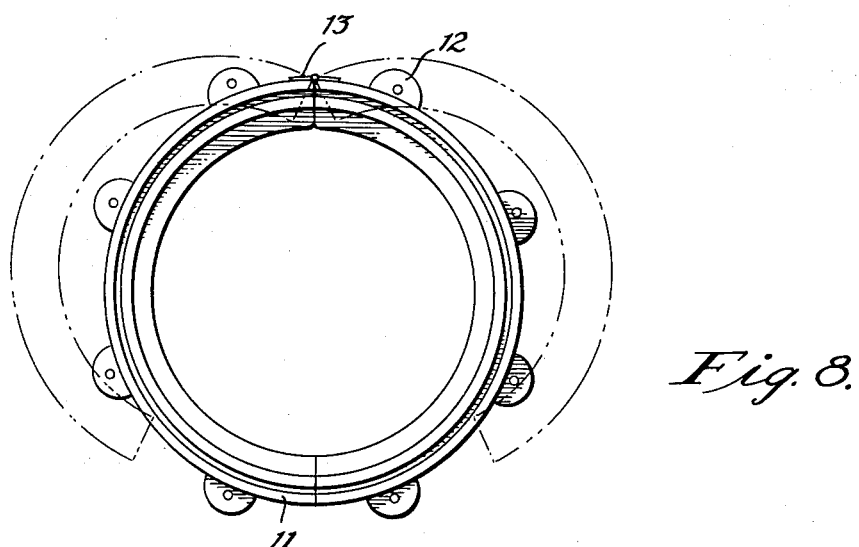

Oct. 11, 1955
J. W. McCLELLAND
2,720,238
AUTO SAFETY SKID DEVICE
Filed June 25, 1954
4 Sheets-Sheet 4
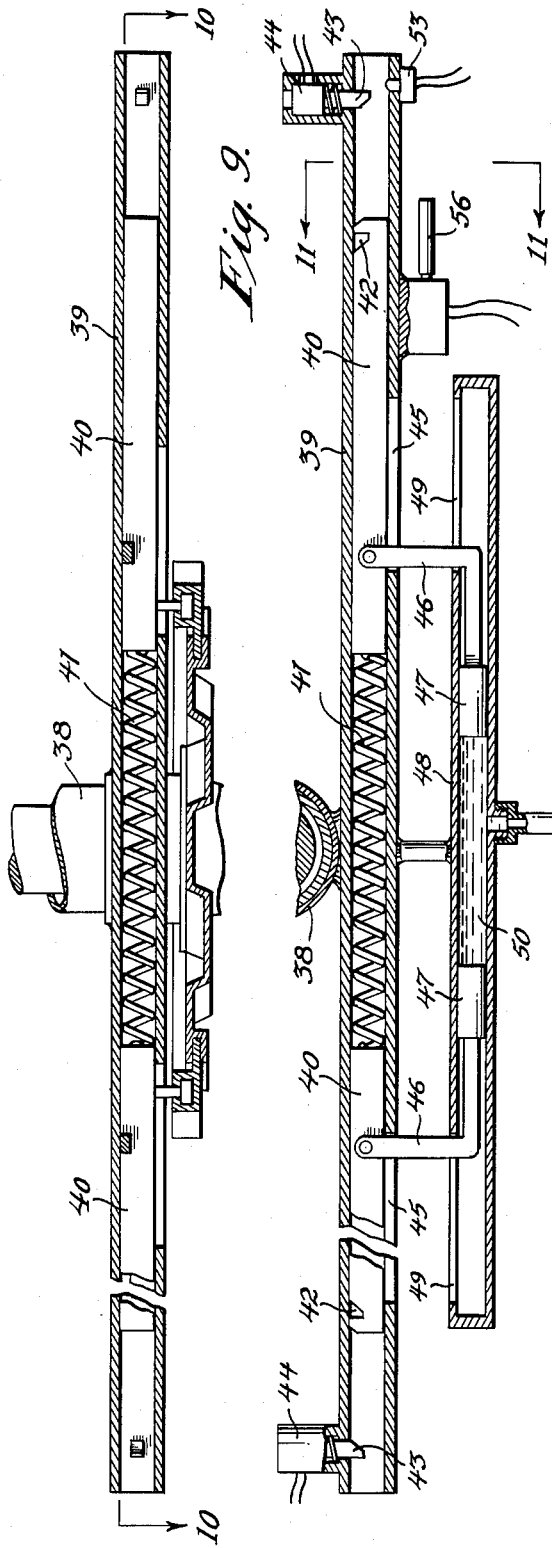
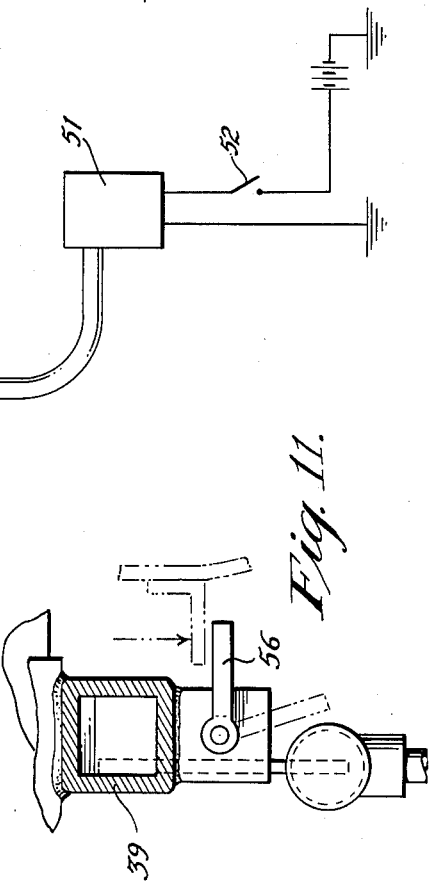
INVENTOR.
JOHN W. McCLELLAND
BY
Joshua R. H. Potts
HIS ATTORNEY.

United States Patent Office 2,720,238
Patented Oct. 11, 1955

2,720,238

AUTO SAFETY SKID DEVICE

John W. McClelland, Philadelphia, Pa., assignor of one-half to Leonard S. Manco, Philadelphia, Pa.

Application June 25, 1954, Serial No. 439,413

9 Claims. (Cl. 152—216)

This invention relates to automobile safety devices, and more particularly to an automobile safety skid device which is an integral part of the automobile structure and operably controlled from the automobile interior.

Automobile safety skid devices which are currently in use for cold weather driving, and which have been in use for a great many years, generally take the form of skid chains which are manually applied to the tire of the vehicle as the need arises. Needless to say this is not the most satisfactory means of applying such a safety device, especially when one finds it necessary to attach a chain to a tire in the midst of a snow storm. In addition, there is the inconvenience of manually detaching the chain from the tire once the snow has melted.

The present invention overcomes these difficulties and inconveniences by providing an automobile safety skid device in the nature of a tire chain, which device is an integral part of the vehicle structure, lying non-rotatively above the wheel within the confines of the fender, and which is adapted to be brought into a rotatable operating position about the wheel by means of control switches located within the automobile interior, and preferably on the dashboard thereof.

It is an object of this invention, therefore, to provide an improved automobile safety skid device.

It is another object of this invention to provide an automobile safety skid device which is an integral part of the vehicle structure.

It is a further object of this invention to provide an automobile safety skid device which may be attached and detached from the vehicle tire, as the need arises, dispensing with the necessity of manually attaching and detaching said device.

A still further object of the invention is to provide an automobile safety skid device whose installation on the vehicle tire is controlled from the interior of the vehicle.

The objects, together with other objectives and advantages to be derived in utilizing the present invention, will become apparent from the following detailed description and from the accompanying drawings describing the preferred embodiment of this invention in which similar numerals refer to similar parts throughout the several views.

Figure 3 is a sectional view of wheel and safety skid device, with parts broken away, taken along the line 3—3 of Figure 1.

Figure 4 is a sectional view, with parts broken away, of one of the skid device tire-grasping bands, taken along the line 4—4 of Figure 1.

Figure 5 is a sectional view, with parts broken away, of part of the split-ring manipulating apparatus, taken along the line 5—5 of Figure 1.

Figure 6 is a sectional view, with parts broken away, of the split-ring guide post, taken along the line 6—6 of Figure 1.

Figure 7 is a sectional view, with parts broken away, of one of the split-ring guide arms, taken along the line 7—7 of Fig. 1.

Figure 8 is a front elevational view of the skid device split-ring, showing its split or open position in phantom.

Figure 9 is a sectional view, with parts broken away, of the split-ring manipulating mechanism, taken along the line 9—9 of Fig. 1.

Figure 10 is a sectional view of the split-ring manipulating mechanism taken along the line 10—10 of Fig. 9.

Figure 11 is a partial sectional view, with parts broken away, of the split-ring disengaging platform, taken along the line 11—11 of Fig. 10.

Figure 1:
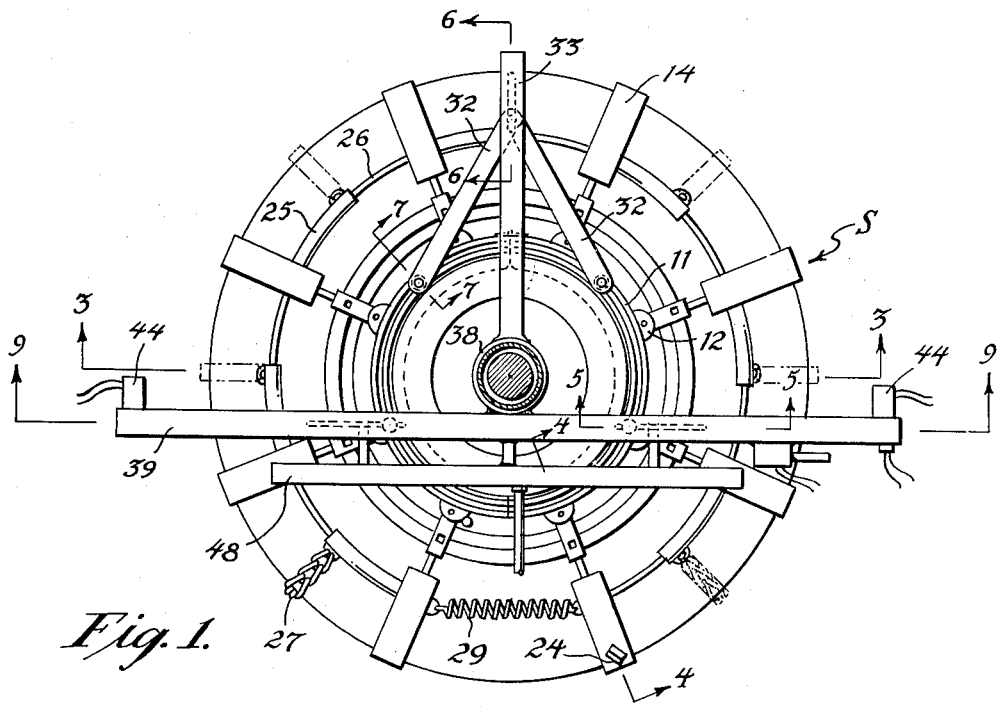
Figure 1 is a rear elevational view of an automobile wheel showing the present safety skid device attached thereto in operating position ready for use.
Figure 2:
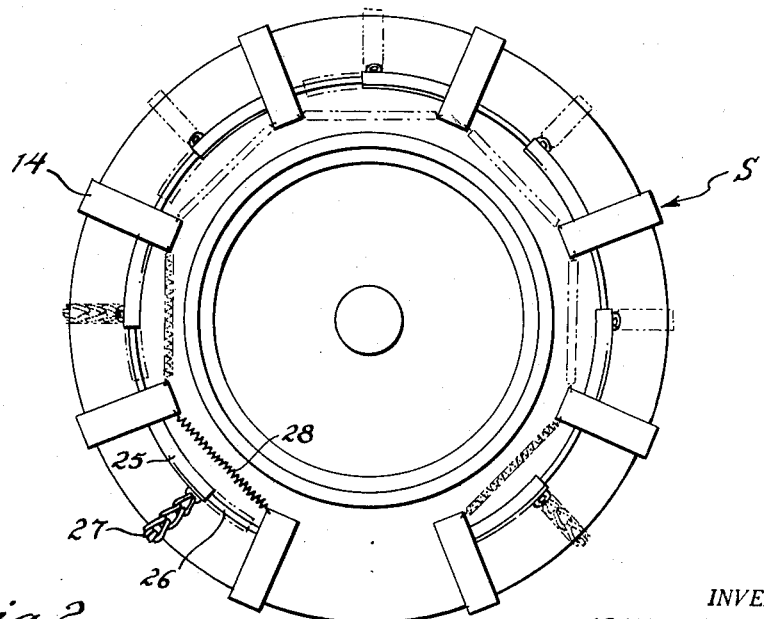
Figure 2 is a front elevational view of the automobile wheel and safety skid device of Figure 1.

Referring to the drawings, and particularly Figs. 1 and 2 thereof, the safety skid device of the present invention is shown therein in its entirety and referred to as such by the letter S. The said skid device S consists of a circumferentially grooved plate 10 fixedly attached to the vehicle wheel, as shown in Figure 3. Slidably retained in the circumferential groove of said plate 10 is a split-ring 11 made in two separate portions, which ring is adapted to operatively carry the skid-chain elements in a manner to be described below. The said split-ring 11 is shown separately in Fig. 8. Integrally attached to the circumferential edge of the said split-ring 11 is a plurality of lugs 12, and the said ring portions are hingedly connected at one end by means of a hinge 13 so as to be capable of assuming an open position, as shown in phantom in Fig. 8.

Pivotally connected to the said lugs 12 are spring-biased tire-grasping bands 14, which connection is shown in detail in Fig. 4. Referring thereto it will be seen that the band 14 has fixedly attached thereto a threaded rod 15 which is slidably received in a spring-retaining bracket member 16, having walls 17 and 18 outstanding perpendicularly therefrom, the said walls being provided with apertures through which said rod 15 passes. Lying between said walls 17 and 18 and surrounding said rod 15 are a pair of coil springs 19 and 20 which are separated by an adjustable nut 21. The bracket 16 is provided with an aperture 22 for gaining access to the nut 21, and is pivotally connected to the lugs 12 by a rivet 23. By adjusting the position of the nut 21 on the threaded rod 15, the compression of the individual springs 19 and 20 is varied so as to effectively vary the grasping strength of the band 14 about the vehicle tires. It will be noted from Figs. 1 and 4, that one of the bands 14 carries a stop-angle 24, for a purpose to be described below.

Looking now at Figs. 1 and 2, it will be seen that each of the bands 14 has rigidly connected thereto, on both sides of the tire, a curved female member 25 and a male member 26, the said members cooperating in piston-like fashion with the respective complementary members of an adjacent band. Attached to the female members 25 on both sides of the tire and passing over the peripheral surface thereof, are skid chains 27. In addition, retaining springs 28 are attached to the bands 14 on the front surface of the tire, as shown in Fig. 2. It will be noted that a spring 28 is omitted from between a pair of bands 14 on the front side of the wheel, but a larger retaining spring 29 is carried by said bands on the rear side of the wheel as shown in Fig. 1.

Looking now at Figs. 3 and 4, it is seen that the split-ring 11 is provided with a T-shaped channel 30 adjacent to its circumferential edge, the open portion of which faces rearwardly with respect to the vehicle wheel, as in Fig. 3. Slidably retained in this channel by means of a complementary T-shaped pivot pin 31, is a pair of vertically movable ring supporting arms 32, shown in Fig. 1, and illustrated in detail in Figs. 6 and 7. The other ends of said arms 32 are slidably connected to a vertical cylindrical member 33 by means of a piston-like pivot member 34 which is simultaneously connected to both said arms 32 by means of a pivot extension 35 integral therewith, the said member 34 being adapted for a reciprocating movement within said cylindrical member 33 under the compressive restraint of a coil spring 36. The member 33 is provided with a slot 37 to accommodate the vertical reciprocating movement of the pivot extension 35. As shown in Fig. 1, the cylindrical member 33 upstands from the automobile wheel axle 38 and is fixedly attached thereto as by welding, or other suitable attachment means.

Integrally connected to the underside of the axle 38 and extending transversely thereof is a tubular member 39 of substantially rectangular cross-section, which member is adapted for housing the mechanism for controlling the manipulation of the split-ring 11 in a manner to be described below.

Looking at Figs. 9 and 10, it is seen that the tubular member 39 houses a pair of rectangular push rods 40 which rods are adapted for a reciprocating movement therewithin and joined by means of a tension spring 41 lying therebetween. The free ends of the push rods 40 are provided with V-notches 42 for receiving locking latches 43, the vertical translational movement of which is controlled by solenoids 44 operatively associated therewith, as shown in Fig. 10 and controlled from a switch located in the automobile interior. Pivotally attached to the push rods 40, and extending downwardly therefrom through slots 45 in the member 39, are L-shaped piston rods 46 integrally connected to a pair of pistons 47 reciprocally housed in a hydraulic cylinder 48 fixedly attached to the member 39 on the underside thereof. The said cylinder 48 is provided with longitudinal slots 49 to accommodate the translational movement of the piston rods 46. The space within the confines of the pistons 47 and the internal surface of the cylinder 48 is adapted to receive a hydraulic fluid 50, which flows thereinto from an outside source under the control of a solenoid 51 which may be actuated from an electrical switch 52 located in the automobile interior. Looking at Fig. 10, the tubular member 39 is provided at one of its ends with an electrical contact switch 53 lying adjacent to the locking latch 43, which switch is adapted for being connected to the solenoid 51 for terminating the flow of hydraulic fluid 50 into the cylinder 48 as the push rods 40 reach their outermost position and are held there by the locking latches 43.

Referring to Fig. 5 it will also be seen that the push rods 40 are each provided with a T-shaped pin 54 the head of which is retained within the channel 30 of the split-ring 11, and the leg of which passes through a longitudinal slot 55 in the tubular member 39. Thus, as the push rods 40 move outwardly toward the locking latches 43, the pins 54, acting through the channel 30 forces the split-ring 11 into an open or split position as depicted in phantom in Fig. 8 and are maintained in such position by means of the locking latches 43. In this position, the present safety skid device is in a detached position from the automobile wheel.

Looking now at Figs. 10 and 11 together, it is seen that the tubular member 39 has attached to its underside, and electrically controlled pivotal platform 56 adapted for assuming a horizontal and vertical position, as shown in Fig. 11. In the horizontal position, the said platform lies in the path of the stop-angle 24 as the wheel rotates, so as to stop the band 14 on which it is mounted, causing the split-ring 11 to split apart in conjunction with the action of the push rods 40, in a manner to be described below. The platform 56 is electrically connected to the above-mentioned switch 52 associated with the solenoid 51, so that as the switch 52 is tripped, the platform 56 assumes a horizontal position so as to cause a splitting apart of the split-ring 11, while at the same time the solenoid 51 causes a flow of hydraulic fluid 50 into the cylinder 48 forcing the push rods 40 to travel outwardly forward toward the latches 43 so as to be held thereby in such position retaining the split-ring 11 in an open position. The platform 56 is also electrically connected with the switch for the solenoid 44, so that the said plaform will assume a vertical position, releasing the stop-angle 24 at the same time that the locking latches 43 release the push rods 40, permitting the split-ring sections to seat themselves in the peripheral groove of the plate 10.

*Operation*

In using the present automobile safety skid device, the various parts thereof are assembled so as to fit about the wheel as shown in Figs. 1 and 2, illustrating the device in a downward position ready for use. In this position the split-ring 11 is in a closed position and seated within the peripheral groove of the plate 10, and the push rods 40 are in an inward position under the influence of the coil spring 41, as shown in Fig. 10.

When road conditions no longer necessitate the use of the skid device, the driver of the automobile may cause the removal of the device from the tire from control switches located within the automobile interior, and preferably on the dashboard therewithin. Thus, by tripping the switch 52, which may be located on the said dashboard, the platform 56 assumes the horizontal position of Fig. 11 in the path of the stop-angle 24, stopping said stop-angle and band 14 to which it is connected causing the split-ring 11 to spread apart, releasing itself from the peripheral groove of the plate 10. At the same time, the tripping of the switch 52 causes actuation of the solenoid 51 controlling the flow of hydraulic fluid 50 into the cylinder 48. When this happens, the pistons 47 move outwardly under the influence of said fluid causing the push rods 40 to extend outwardly from their central position within the tubular member 39, until said push rods contact the locking latches 43, which latches seat themselves in the V-notches 42 holding the push rods in an outward position. At the same time one of the said push rods 40 contacts a switch 53 which actuates the solenoid 51 to stop the flow of hydraulic fluid into the cylinder 48. The push rods 40, being connected to the split-ring 11 by means of the pin 54, thus hold the said split-ring in an open or split position.

It will be noted from Fig. 8 that as the split-ring 11 opens, it rises upwardly, so that the bands 14 and chains 27 are lifted from the tire. This is accomplished by means of the bracket members 16 which carry the spring-biased rods 15 attached to the bands 14 and which are pivotally connected to the lugs 12 of the split-ring 11. The upward movement of the bands 14 is accommodated by the telescoping action of the female members 25 and male members 26, the chains 27 rising simultaneously, being attached to the said female members. When the bands 14 and chains 27 rise upwardly, they become hidden within the confines of the automobile fenders.

When it is again desired to install the skid device about the tire, a switch located within the automobile interior and operatively connected to the solenoids 44 and platform 56 is tripped, whereupon the said solenoid causes the locking latches 43 to rise upwardly out of the V-notches 42 thus releasing the push rods 40 which are immediately pulled inwardly toward each other by the coil spring 41. And the push rods being connected to the split-ring 11 by the pins 54, cause the said split-ring to seat itself in the peripheral groove of the plate 10. The bands 14 and chains 27 being operatively connected to the split-ring 11, as described above, are thus automatically installed about the tire, as shown in Figs. 1 and 2. The tripping of the switch for the solenoids 44 also causes the platform 56 to assume a vertical position so as not to interfere with the rotation of the stop-angle 24 on one of the bands 14. The installation of the safety skid device is thus completed.

It is seen from the above description of the present invention that a novel automobile safety skid device is provided which is an integral part of the vehicle structure, dispensing with the necessity of manually attaching and detaching such a device from the vehicle tires as is the customary practice at the present time.

Although the present discussion of this invention has been limited to the above-described preferred embodiment, variations thereof are possible without departing from the spirit of the invention. It is therefore not intended that the invention be limited to the particular embodiment disclosed, but only to the inventive concept as defined in the appended claims.

What is claimed is:

1. An automobile safety skid device comprising, a circular plate having a peripheral groove and adapted for being attached to an automobile wheel, a split-ring slidably mounted in said peripheral groove, tire-grasping bands carried by said split-ring, connecting members between said bands, skid chains attached to said connecting members, and means cooperating with said split-ring for opening and closing said ring for the purpose of installing said skid chains on an automobile tire.

2. An automobile safety skid device comprising, a circular plate having a peripheral groove and adapted for being attached to an automobile wheel, a hingedly-joined split-ring slidably mounted in said peripheral groove, tire-grasping bands pivotally attached to said split-ring, connecting members between said bands, skid chains attached to said connecting members, and means cooperating with said split-ring for opening and closing said split-ring for the purpose of installing said skid chains on an automobile tire.

3. An automobile safety skid device comprising, a circular plate having a peripheral groove and adapted for being attached to an automobile wheel, a hingedly-joined split-ring slidably mounted in said peripheral groove, tire-grasping bands radially disposed about said split-ring and pivotally attached thereto, connecting members between said bands and attached thereto, skid chains carried by said connecting members, and hydraulically operated means cooperating with said split-ring for opening and closing said split-ring for the purpose of installing said skid chains on an automobile tire.

4. An automobile safety skid device comprising, a circular plate having a peripheral groove and adapted for being attached to an automobile wheel, a hingedly-joined split-ring slidably mounted in said peripheral groove, spring-biased tire-grasping bands radially disposed about said split-ring and pivotally attached thereto, telescoping connecting members between said bands and fixedly attached thereto, skid chains carried by said connecting members, and hydraulically operated means cooperating with said split-ring for opening and closing said split-ring for the purpose of installing said skid chains on an automobile tire.

5. An automobile safety skid device comprising, a circular plate having a peripheral groove and adapted for being attached to an automobile wheel, a hingedly-joined split-ring slidably mounted in said peripheral groove, spring-biased tire-grasping bands radially disposed about said split-ring and pivotally attached thereto, telescoping connecting members between said bands and fixedly attached thereto, skid chains carried by said connecting members, a transverse tubular member parallel to said circular plate and adapted for being attached to the axle of the automobile wheel, push rods residing in said tubular member and adapted for a reciprocating movement therewithin, the said push rods being slidably connected to said split-ring for the purpose of opening and closing said ring to install said chains on a tire, and hydraulically operated means for actuating said push rods.

6. An automobile safety skid device comprising, a circular plate having a peripheral groove and adapted for being attached to an automobile wheel, a hingedly-joined split-ring slidably mounted in said peripheral groove, spring-biased tire-grasping bands radially disposed about said split-ring and pivotally attached thereto, telescoping connecting members between said bands and fixedly attached thereto, skid chains carried by said connecting members, a transverse tubular member parallel to said circular plate and adapted for being attached to the axle of the automobile wheel, push rods residing in said tubular member and adapted for a reciprocating movement therewithin, the said push rods being slidably connected to said split-ring for the purpose of opening and closing said ring to install said chains on a tire, hydraulically operated means for actuating said push rods into an extended transverse position within said tubular member, locking-latches carried by said tubular member for holding said push rods in an extended position, and spring means within said tubular member for pulling said push rods into a retracted position therewith upon release of said locking-latches.

7. An automobile safety skid device comprising, a circular plate having a peripheral groove and adapted for being attached to an automobile wheel, a hingedly-joined split-ring slidably mounted in said peripheral groove, spring-biased tire-grasping bands radially disposed about said split-ring and pivotally attached thereto, telescoping connecting members between said bands and fixedly attached thereto, skid chains carried by said connecting members, a transverse tubular member parallel to said circular plate and adapted for being attached to the axle of the automobile wheel, push rods residing in said tubular member and adapted for a reciprocating movement therewithin, the said push rods being slidably connected to said split-ring for the purpose of opening and closing said ring to install said chains on a tire, a hydraulic cylinder connected to said tubular member, pistons within said cylinder having piston rods attached to said push rods, the said pistons being adapted for actuating said push rods into an extended transverse position within said tubular member, solenoid controlled locking latches carried by said tubular members for holding said push rods in an extended position, and spring means within said tubular member for pulling said push rods into a retracted position therewithin upon release of said locking latches.

8. An automobile safety skid device comprising, a circular plate having a peripheral groove and adapted for being attached to an automobile wheel, a hingedly-joined split-ring slidably mounted in said peripheral groove, spring-biased tire-grasping bands radially disposed about said split-ring and pivotally attached thereto, telescoping connecting members between said bands and fixedly attached thereto, skid chains carried by said connecting members, a transverse tubular member parallel to said circular plate and adapted for being attached to the axle of the automobile wheel, push rods residing in said tubular member and adapted for a reciprocating movement therewithin, the said push rods being slidably connected to said split-ring for the purpose of opening and closing said ring to install said chains on a tire, a hydraulic cylinder connected to said tubular member, pistons within said cylinder having piston rods attached to said push rods, the said pistons being adapted for actuating said push rods into an extended transverse position within said tubular member, solenoid controlled locking latches carried by said tubular member for holding said push rods in an extended position, a contact switch within said tubular member for terminating the actuation of said hydraulic cylinder, the said switch being adapted for being tripped by one of said push rods upon extension thereof to a locked position, and a tension spring within said tubular member between said push rods and attached thereto for pulling said rods into a retracted position therewithin upon release of said locking latches.

9. An automobile safety skid device comprising, a circular plate having a peripheral groove and adapted for being attached to an automobile wheel, a hingedly-joined split-ring slidably mounted in said peripheral groove, spring-biased tire-grasping bands radially disposed about said split-ring and pivotally attached thereto, telescoping connecting members between said band and fixedly attached thereto, skid chains carried by said connecting members, a transverse tubular member parallel to said circular plate and adapted for being attached to the axle of the automobile wheel, push rods residing in said tubular member and adapted for a reciprocating movement therewithin, the said push rods being slidably connected to said split-ring for the purpose of opening and closing said ring to install said chains on a tire, a hydraulic cylinder connected to said tubular member, pistons within said cylinder having piston rods attached to said push rods, the said pistons being adapted for actuating said push rods into an extended transverse position within said tubular member, solenoid controlled locking latches carried by said tubular members for holding said push rods in an extended position, a contact switch within said tubular member for terminating the actuation of said hydraulic cylinder, the said switch being adapted for being tripped by one of said push rods upon extension thereof to a locked position, a tension spring within said tubular member between said push rods and attached thereto for pulling said rods into a retracted position therewithin upon release of said locking-latches, a stop-angle on one of said tire-grasping bands, and an electrically operated pivoted platform carried by said tubular member for stopping said stop-angle in its path of rotation so as to cause a splitting apart of said split-ring, the said platform being adapted for releasing said stop-angle simultaneously with the release of said locking-latches.

References Cited in the file of this patent
UNITED STATES PATENTS

| | | |
|---|---|---|
| 1,488,333 | Force | Mar. 25, 1924 |
| 2,581,770 | Pittinger | Jan. 8, 1952 |
| 2,625,441 | DeRagon | Jan. 13, 1953 |